Jan. 11, 1966 A. P. TUMONIS 3,228,320
DOUGHNUT INVERTER
Filed Oct. 5, 1964 2 Sheets-Sheet 1
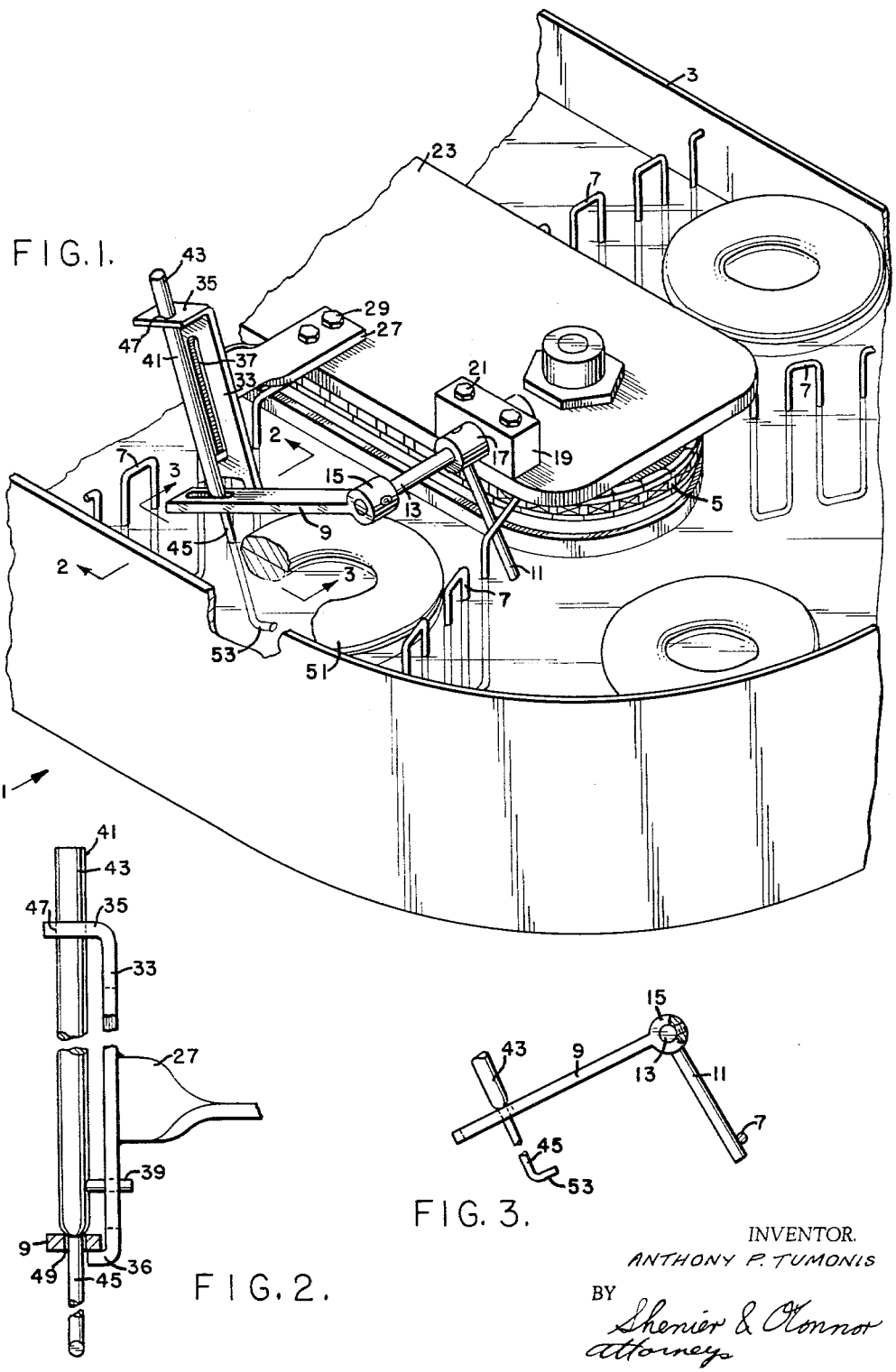
INVENTOR.
ANTHONY P. TUMONIS
BY
Shenier & O'Connor
Attorneys

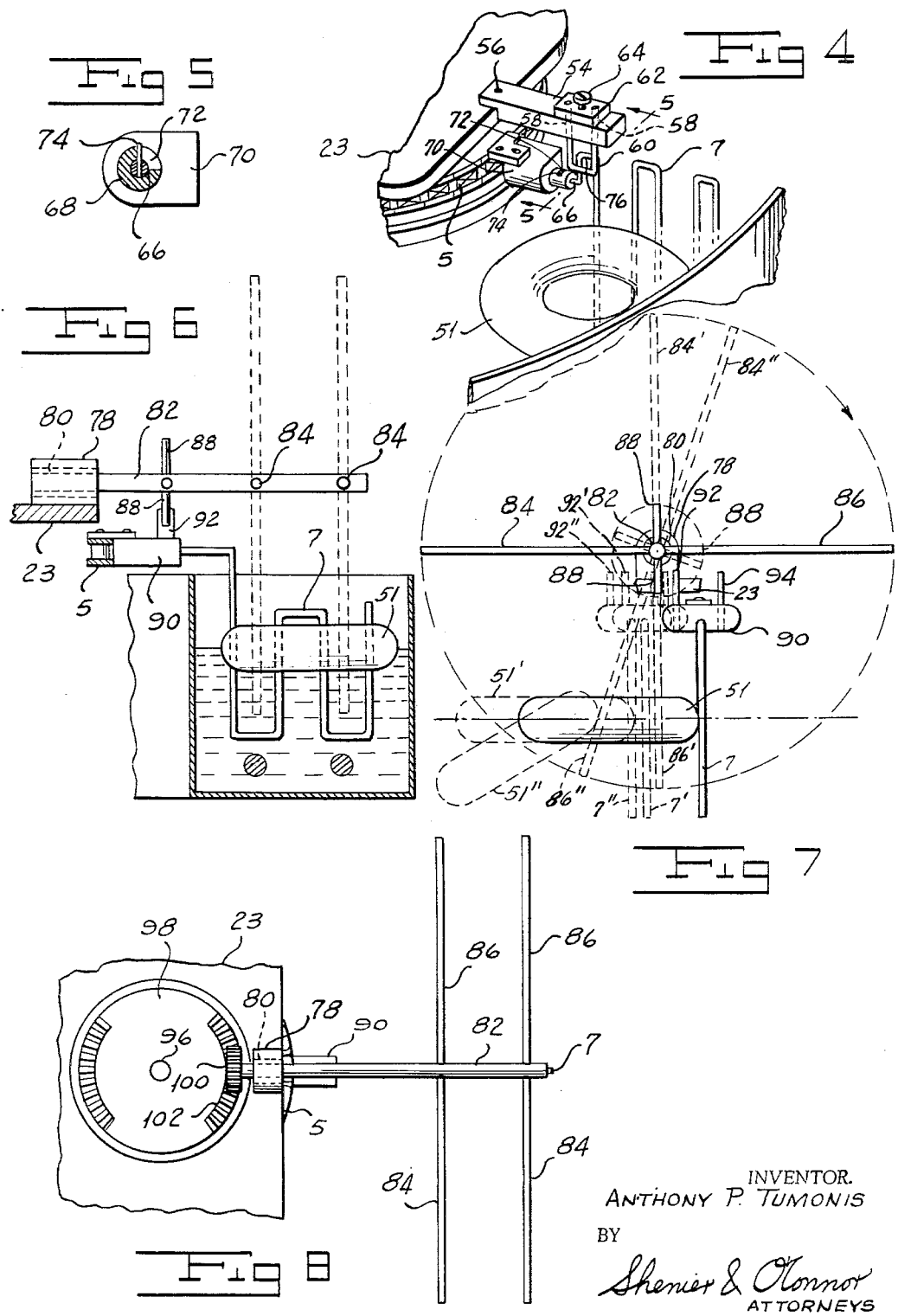

United States Patent Office 3,228,320
Patented Jan. 11, 1966

3,228,320
DOUGHNUT INVERTER
Anthony P. Tumonis, 216 2nd St., Albany, N.Y.
Filed Oct. 5, 1964, Ser. No. 401,622
12 Claims. (Cl. 99—409)

This application is a continuation-in-part of my copending application, Serial No. 193,984, filed May 11, 1962, and now abandoned, for a Device for Turning Over Donuts.

My invention relates to a donut inverter and more particularly to a device for inverting articles being cooked, which device is simpler, more compact, cleaner and more certain in operation than are inverting devices of the prior art.

There are known in the prior art machines for cooking articles such as donuts in which the article is advanced along a predetermined path while buoyantly supported in the heated cooking fluid. After having traveled a predetermined distance along this path in the fluid, the article is cooked on its underside. In order that the cooking operation be completed it is necessary that the article be inverted so that it is buoyantly supported with the already cooked side up to permit the other side to be cooked.

The operation described above of inverting the article to permit cooking of both sides thereof usually is accomplished in the prior art by a device which physically lifts the donut out of the cooking fluid and then drops the article uncooked side down into the fluid. In the course of this operation the article usually is shifted laterally of the first path to a second path. There is also known in the prior art another device for inverting the article wherein it travels into a cage which pivots about an axis to turn the article through 180 degrees.

While those devices of the prior art achieve the operation of inverting the article, they embody a number of defects. First, when the donut is physically lifted out of the cooking fluid and subsequently dropped therein, the fluid splashes on the operating parts of the device necessitating frequent cleaning thereof. Not only is that true but the devices generally are complicated and consequently expensive. Moreover, owing to the complicated nature of the devices, machines incorporating them are cumbersome and occupy an inordinate amount of space.

A further significant defect of inverting devices of the prior art is the fact that in the course of the inverting operation, the article slides or shifts on the inverting member and the uncooked dough on the upper side of the article comes into contact with the operating parts of the machine and adheres thereto. After a period of time in operation this buildup of material interferes with proper operation of the machine. Thus for that reason, as well as a result of the splashing of fluid, cleaning becomes necessary at frequent intervals.

I have invented a donut inverter which overcomes the defects of inverters of the prior art pointed out hereinabove. My inverter turns the article being cooked while it is buoyantly supported in the cooking fluid. My device accomplishes this operation without contacting any of the uncooked portion of the article. It is simpler and more compact than are turning devices of the prior art. It is cleaner in operation than are devices of the prior art for inverting articles.

One object of my invention is to provide a donut inverter which overcomes the defects of inverting devices of the prior art.

Another object of my invention is to provide a donut inverter which is simpler and more compact than are donut inverters of the prior art.

A further object of my invention is to provide a device for inverting donuts while they are buoyantly supported in a cooking fluid.

A still further object of my invention is to provide a device for inverting donuts without contacting the uncooked portion of the article.

Yet another object of my invention is to provide a donut inverter which is cleaner in operation than are donut inverters of the prior art.

Other and further objects of my invention will appear from the following description.

In general my invention contemplates the provision of means responsive to movement of an article pusher for applying a turning moment to the underside of an article being cooked as it advances through and while it is buoyantly supported in a cooking fluid whereby to invert the article.

In the accompanying drawings which form part of the instant specification and which are to be read in conjunction therewith and in which like reference numerals are used to indicate like parts in the various views:

FIGURE 1 is a fragmentary perspective view of an article cooker provided with my donut inverter.

FIGURE 2 is a fragmentary elevation taken generally along the line 2—2 of FIGURE 1.

FIGURE 3 is a fragmentary elevation of a portion of my donut inverter taken generally along the line 3—3 of FIGURE 1.

FIGURE 4 is a fragmentary perspective view of an alternate form of my donut inverter.

FIGURE 5 is a fragmentary sectional view of my donut inverter taken along the line 5—5 of FIGURE 4.

FIGURE 6 is a fragmentary sectional view illustrating a further form of my donut inverter.

FIGURE 7 is a partially schematic view illustrating the mode of operation of the form of my inverter shown in FIGURE 6.

FIGURE 8 is a fragmentary sectional view of yet another form of my donut inverter.

Referring now to FIGURES 1 to 3 of the drawings, a cooker indicated generally by the reference character 1 adapted to cook articles includes a tank 3 containing a a supply of cooking fluid which is heated in a manner known to the art to a temperature which will cook articles of dough placed in the fluid. A pitch chain 5 continuously driven by a suitable prime mover such as a motor (not shown) carries a plurality of article pushers 7 at predetermined spaced locations along its length. The pushers 7 are generally serpentine in configuration and they extend downwardly into the cooking fluid for a predetermined distance. In a manner known to the art, articles of dough such, for example, as rings 51 are deposited in the cooking fluid in advance of the direction of movement of the pushers 7. After having thus been deposited in the fluid, the articles are buoyantly supported therein and are advanced along a predetermined path by the pushers 7. After the articles have traveled for a sufficient distance along their path in the fluid, the underside of the article which is disposed in the fluid is cooked. In order that the cooking operation be completed, the article must be inverted so that the uncooked side rests in the cooking fluid for the remainder of the travel of the article. At the end of its travel through the fluid, the article is completely cooked and may be removed from the tank by any suitable means known to the art.

The form of my inverter illustrated in FIGURES 1 to 3 includes a crank arm 11 carried by a hub 17 secured to a shaft 13 rotatably supported in a bracket 19 secured to a support plate 23 by any suitable means known to the art such, for example, as screws 21. In response to movement of a pusher 7 in the direction indicated by the arrow A in FIGURE 1, the portion of the pusher extending from the pitch chain 5 engages the crank arm 11 to pivot shaft 13 in a clockwise direction as viewed in FIGURE 3. I secure a hub 15 of a second crank arm 9 to the end of shaft 13. In its rest position, crank arm 9 rests on a flange 36 at the lower end of a guide 33 carried by a bracket 27 secured to the plate 23 by any suitable means such as by screws 29. An opening 47 in a flange 35 at the upper end of guide 33 receives a rod 43. A pin 39 extending laterally from rod 43 rides in a slot 37 formed in the guide 33. The lower end of the rod 43 carries a finger 45 of a reduced cross-section area which extends through a slot 49 formed in the crank arm 9. I provide the lower end of the finger 45 with an offset 53.

As has been explained hereinabove, when a pusher 7 moves in the direction of the arrow A in FIGURE 1, it engages the crank 11 to rotate shaft 13 in a clockwise direction. When this occurs, crank 9 moves in a clockwise direction and the sides of the crank defining the slot 49 engage the underside of rod 43 to lift the rod vertically. I so locate rod 43 that an article 51 being advanced by the pusher 7 which operates crank 11 is in a position at which the underside of the leading portion thereof can be engaged by the offset 53 as the rod 43 is raised. As the offset 53 engages the underside of the leading portion of the article 51, it imparts a turning moment thereto.

Under the action of this turning moment described above, the article begins to rotate and ultimately turns completely over so that the uncooked side thereof now rests in the cooking fluid. This operation takes place without any engagement of an uncooked part of the donut with the operating parts of the mechanism. This will be apparent from a consideration of the fact that as the leading portion of the donut is raised by the offset, the trailing portion moves down and away from the pusher which is advancing the article. The article then has completely flipped by the time the pusher again comes into engagement with the article. I so arrange the parts of my device that the upward movement of finger 45 is relatively rapid. For that reason and owing to the forward momentum of the article in the fluid, the turning operation takes place quickly. Since the article 51 is buoyantly supported during the turning operation the force exerted by finger 53 need not be large.

After the article pusher 7 leaves the crank 11, rod 43 and the crank 9 return to their normal position under the influence of gravity.

Referring now to FIGURES 4 and 5, I have shown an alternate form of my donut inverter in which a bracket 54 is secured to the plate 23 by any suitable means such, for example, as by a screw 56. I provide the bracket 54 with bores 58 which slidably receive the legs of a U-shaped stop 60. I secure the ends of the legs in a block 62 carrying a screw 64 threaded through the block 62 to position the block vertically and thus fix the height of the lower end of the stop 60. It will be appreciated that if screw 64 is turned in, its lower end bears against the bracket 54 to raise block 62 and the stop 60. Conversely, if the screw is backed off, the stop 60 can be lowered.

In the form of my inverter shown in FIGURES 4 and 5 the shaft 66 of the pusher 7 is received in a journal 68 carried by a fitting 70 secured to the pitch chain 5. I provide the journal 68 with a slot 72 having an arcuate extent of about 90 degrees. A radially extending pin 74 carried by the shaft 66 for rotation therewith rides in the slot 72. Owing to the arrangement just described, the shaft 66 can rotate approximately 90 degrees in a clockwise direction as viewed in FIGURE 5 from a generally vertical position but is prevented from rotating in a counterclockwise direction from that vertical position.

I provide the form of the pusher 7 shown in FIGURES 4 and 5 with a vertical extension 76 connecting the shaft 66 to the pusher. In the course of movement of the pusher 7 past the stop 60 the stop engages the extension 76 to rotate shaft 66 in a clockwise direction. Owing to this rotation of the shaft the lower portion of the pusher engages the underside of the trailing edge of the article and imparts a turning moment thereto of sufficient magnitude to cause the article to rotate through 180 degrees so that its uncooked side now rests in the cooking fluid. The upward movement of that portion of the pusher which engages the article is sufficiently rapid as to provide the force necessary to produce the required turning moment. Preferably I locate stop 60 at a position at which the pusher 7 is rounding the bend of the tank so that the projection 76 has a relatively higher velocity than when it is moving along a side of the tank. Owing to the fact that the article is buoyantly supported during turning as the leading portion dips into the fluid a drag is exerted thereon to enhance the turning action of the force of the pusher. Moreover, since the article is buoyantly supported in the fluid during turning, the force provided by the pusher need not be great. While the operation of the form of my invention shown in FIGURES 4 and 5 is similar to that of the form of my invention shown in FIGURES 1 to 3 in that the turning operation is achieved while the article is being advanced and while it is buoyantly supported in the fluid and without touching the uncooked portion of the article with an operating part, it differs in that the article is turned over or flipped in the direction of its movement along a path in the fluid rather than in a direction against the direction of its movement along the path in the fluid as in the form of the invention shown in FIGURES 1 to 3.

Referring now to FIGURES 6 and 7, in yet another form of my donut inverter plate 23 carries a bearing block 78 having a friction bushing 80 therein which carries a shaft 82. Bushing 80 permits shaft 82 to be driven in response to a positive force and retains the shaft in that position to which it has been moved. Shaft 82 carries two pairs of diametrically spaced oppositely extending inverting arms 84 and 86 which in the normal position of the shaft 82 extend generally horizontally. I provide the shaft 82 with four pins 88 equally spaced around the shaft at a location adjacent the edge of plate 23.

The fitting 90 which rigidly supports the pusher 7 in the form of my inverter shown in FIGURES 6 and 7 carries a pair of spaced driving elements 92 and 94. I so position pins 88 with relation to the elements 92 and 94 that the latter engage the former as the pusher 7 passes the shaft 82.

As the fitting 90 carrying the driving elements 92 and 94 moves from the full-line position shown in FIGURE 7 to the broken-line position, element 92 first engages the downwardly extending pin 88 to rotate shaft 82 through about 90 degrees. As the element 92 leaves that pin 88, arms 84 and 86 are generally vertical and element 94 is in a position to engage the pin 88 following that engaged by element 92 in the direction of rotation of shaft 82. In response to movement of the pusher 7 from that position, element 94 causes the arms 86 to move in a clockwise direction through substantially another 90 degrees to a horizontal position such as that position shown in the drawings as being occupied by arms 84. As this latter movement occurs, the arms 86 engage the underside of the article to impart such a force thereto as to produce a turning moment which inverts the article. In turning, the trailing part of the article moves up and in the direction of movement of the article. It will readily be appreciated that the pusher 7 is so shaped as to permit the arms 84 and 86 to pass thereby without interference. In FIGURE 7 I have illustrated in broken lines two relative positions of the parts in the course of the turning operation. In the first relative position in which the arm 86 just engages the article the parts are identified by primed reference characters. In the second relative position in which the turning operation has progressed substantially, the parts are identified by double primed reference characters.

Referring now to FIGURE 8 I have illustrated an alternate drive means for the shaft 82. In that form of my device the pitch chain sprocket wheel shaft 96 carries a sectioned ring gear 98, the teeth of which are adapted to be engaged by a gear 100 carried by a portion of shaft 82 extending inwardly beyond the bearing support 78. I provide the gear 98 with groups of teeth 102 such that a pusher 7 moves by the shaft 82, the gear 100 engages a set of teeth. That is, if during the course of a revolution of shaft 96, two pushers 7 move past support 78 then I provide the gear 98 with two groups of teeth 102. If four pushers 7 pass the support 78 in the course of a single revolution of shaft 96 then I provide four spaced groups of teeth 102 on gear 98. This of course is determined by the spacing of pushers and the relative dimensions of the parts. I so arrange the ratio of gears 98 and 100 that one set of teeth 102 produces 180 degrees of rotation of the shaft 82 to achieve the inverting operation described above in connection with FIGURES 6 and 7.

From the foregoing description it will readily be seen that each form of my device comprises an intermittently actuated turning means including the article advancing means in part and having a component pivoted at a point above the predetermined article path and a portion movable rapidly upwardly into contact with a submerged portion of the article to impart only a single sudden upwardly directed force to the submerged portion at one side of a horizontal centerline generally perpendicular to the path. The portion on the other side of the article centerline is free and the article is inverted while principally buoyantly supported in the fluid.

In operation of the form of my inverter shown in FIGURES 1 to 3, as the chain 5 drives the pusher 7 to advance the partially cooked articles 51 toward the finger 45, the articles are completely cooked on the underside thereof. As a pusher 7 engages crank 11, an article 51 is in a position at which its leading portion is adapted to be engaged by the offset 53. When shaft 13 rotates under the action of the engagement of the pusher with crank 11, rod 43 is lifted vertically to cause the offset 53 to impart a turning moment to the article 51. The actuation of crank 11 by pusher 7 raises the rod 43 in such a manner that the offset 53 imparts sufficient force to the article 51 to invert the article so that its uncooked side rests in the cooking fluid. After the pusher 7 leaves crank 11, rod 43 returns to its rest position. It will readily be understood that after being inverted the article 51 passes under the offset 53. This of course occurs before finger 45 resets.

In operation of the form of my invention shown in FIGURES 4 and 5, as a pusher 7 passes by the stop 60 its projection 76 strikes the stop and the pusher rotates through a limited distance in a clockwise direction to "kick" the trailing edge of the cooked underside of the article to impart such a turning moment thereto as to invert the article.

In the form of my inverter shown in FIGURES 6 and 7, as the pusher 7 moves past the location of shaft 82, pins 92 and 94 engage successive pins 88 on shaft 82 to rotate the shaft through substantially 180 degrees. In the course of the terminal 90 degrees of this movement, the trailing pair of arms 86 or 84 engage the trailing portion of the cooked underside of the article to impart a turning moment thereto to invert the article. The operation of the form of my device illustrated in FIGURE 8 is substantially the same as that of the form shown in FIGURES 6 and 7 with the exception that the driving force is imparted by the groups of teeth 102 on the ring gear 98.

In all forms of my device the inverting operation is achieved while the article is buoyantly supported in the fluid. Owing to the fact that it is thus supported during turning, very little force is required to achieve the turning operation. Moreover, all forms of my device accomplish the turning operation without contacting the uncooked portion of the article with any of the operating parts of the machine. The forms of my device shown in FIGURES 4 to 8 differ from the operation of the form shown in FIGURES 1 to 3 only in the direction of rotation of the article during inversion.

It will be seen that I have accomplished the objects of my invention. I have provided a device for inverting donuts which overcomes the defects of inverting devices of the prior art. My device achieves this result without contacting any of the uncooked parts of the article with operating parts of the machine. I do not lift the article out of the cooking fluid during the turning operation with the result that there is little or no splashing. My inverter is extremely simple in its construction and operation. It permits of the manufacture of a much more compact machine than can be made where inverters of the prior art are employed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In apparatus for cooking an article buoyantly supported in a cooking fluid, means for advancing an article along a predetermined path in said fluid, said article having a horizontal centerline generally perpendicular to said path, and intermittently actuated means, including said advancing means in part, having a component pivoted at a point above said predetermined path and a portion movable rapidly upwardly into contact with a submerged portion of said article for imparting only a single sudden generally upwardly directed force to the submerged portion of said article at one side of said centerline with the portion of the article on the other side of said centerline being free and with said article principally buoyantly supported in said fluid to invert said article as it advances.

2. Apparatus as in claim 1 wherein said path comprises a linear portion and an arcuate portion whereby said article is accelerated in said arcuate portion over its speed in said linear portion and wherein said intermittently actuated means is located adjacent said arcuate path portion.

3. Apparatus as in claim 1 wherein said portion comprises an arm and said component comprises a shaft mounting said arm at a fixed location along said path for rotary movement through said fluid and wherein said intermittently actuated means includes means for rotating said shaft.

4. Apparatus as in claim 1 wherein said advancing means includes a pusher having a configuration with generally vertical convolutions extending into said fluid, means mounting said pusher for movement along said path and means for driving said pusher and wherein said portion comprises an arm and said component comprises a shaft mounting said arm at a fixed location along said path for rotary movement of said arm from a position out of said fluid into said fluid and between said convolutions as said pusher moves past said location and wherein said intermittently actuated means includes means for rotating said shaft.

5. Apparatus as in claim 4 in which said shaft rotating means comprises interdigitating elements on said shaft and on said pusher mounting means.

6. Apparatus as in claim 4 in which said drive means includes a second shaft and in which said arm mounting shaft rotating means comprises a sectioned ring gear on said second shaft and a gear on said arm shaft.

7. Apparatus as in claim 1 wherein said advancing means comprises a pusher, means mounting said pusher for movement in a given direction along a predetermined path in said fluid and for limited swinging movement in said direction and means for driving said pusher along said path and wherein said intermittently actuated means comprises means for swinging said pusher in said direction.

8. Apparatus as in claim 7 in which said pusher swinging means includes a stationary stop disposed at a location along said path and an extension on said pusher for engaging said stop as said pusher moves past said location.

9. Apparatus as in claim 1 wherein said article advancing means comprises a pusher and wherein said portion comprises a finger adapted to engage said article and means mounting said finger for reciprocating movement in said path, and wherein said component comprises a shaft, said intermittently actuated means including a first crank carried by said shaft and engageable by said pusher as it moves along said path for rotating said shaft and a second crank carried by said shaft for reciprocating said finger in response to movement of said pusher to engage said finger with said article being advanced by said pusher.

10. In apparatus for cooking an article buoyantly supported in a cooking fluid, means for advancing an article along a predetermined path in said fluid, said article having a horizontal centerline generally perpendicular to said path, and intermittently actuated means, including said advancing means in part, having a component pivoted at a point above said predetermined path and a portion movable rapidly upwardly into contact with a submerged portion of said article for imparting only a single sudden upwardly directed force to the submerged portion of said article and limited to an area at one side of said centerline to invert said article while principally buoyantly supported in said fluid.

11. Apparatus as in claim 10 in which said article has a leading portion and a trailing portion and wherein said component contacts the trailing portion.

12. Apparatus as in claim 10 in which said article has a leading portion and a trailing portion and wherein said component contacts the leading portion.

References Cited by the Examiner
UNITED STATES PATENTS

| | | | |
|---|---|---|---|
| 1,467,396 | 9/1923 | Schroyer | 99—406 |
| 1,665,017 | 4/1928 | Bergner | 99—406 |
| 1,965,241 | 7/1934 | Hunter | 99—409 X |
| 2,006,832 | 7/1935 | Hunter | 99—405 |
| 2,067,849 | 1/1937 | Hunter | 99—405 |
| 2,191,284 | 2/1940 | Morris | 99—405 X |
| 2,207,546 | 7/1940 | Lagaard | 99—406 |
| 2,537,204 | 1/1951 | Brickson | 99—409 |
| 2,735,357 | 2/1956 | Gagnon | 99—409 |
| 2,767,641 | 10/1956 | Ackles | 99—409 X |

FOREIGN PATENTS

| | | |
|---|---|---|
| 476,793 | 12/1937 | Great Britain. |

WALTER A. SCHEEL, *Primary Examiner.*
ROBERT E. PULFREY, *Examiner.*
STANLEY P. FISHER, *Assistant Examiner.*